US012175194B2

(12) United States Patent
Qu et al.

(10) Patent No.: US 12,175,194 B2
(45) Date of Patent: Dec. 24, 2024

(54) VIDEO CLASSIFICATION METHOD AND APPARATUS, COMPUTER DEVICE, AND STORAGE MEDIUM

(71) Applicant: Tencent Technology (Shenzhen) Company Limited, Shenzhen (CN)

(72) Inventors: Bing Xin Qu, Shenzhen (CN); Mao Zheng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 734 days.

(21) Appl. No.: 17/192,580

(22) Filed: Mar. 4, 2021

(65) Prior Publication Data

US 2021/0192220 A1 Jun. 24, 2021

Related U.S. Application Data

(63) Continuation of application No. PCT/CN2019/116660, filed on Nov. 8, 2019.

(30) Foreign Application Priority Data

Dec. 14, 2018 (CN) .......................... 201811535837.0

(51) Int. Cl.
*G06F 40/30* (2020.01)
*G06F 18/22* (2023.01)
(Continued)

(52) U.S. Cl.
CPC .............. *G06F 40/30* (2020.01); *G06F 18/22* (2023.01); *G06F 18/2415* (2023.01);
(Continued)

(58) Field of Classification Search
CPC ...... G06F 40/30; G06F 18/22; G06F 18/2415; G06F 18/2431; G06F 40/279;
(Continued)

(56) References Cited

U.S. PATENT DOCUMENTS

2013/0018736 A1  1/2013  Raichelguaz et al.
2017/0308753 A1  10/2017  Wu et al.

FOREIGN PATENT DOCUMENTS

CN  101937445 A  1/2011
CN  103200463 A  7/2013
(Continued)

OTHER PUBLICATIONS

Poria, Soujanya, et al. "Context-dependent sentiment analysis in user-generated videos." Proceedings of the 55th annual meeting of the association for computational linguistics (vol. 1: Long papers). 2017. (Year: 2017).*

(Continued)

*Primary Examiner* — Jonathan S Lee
(74) *Attorney, Agent, or Firm* — Crowell & Moring LLP

(57) ABSTRACT

Video classification accuracy can be improved by utilizing multiple features. Classification based on a combination of an image classification model, an audio classification model, and a textual description classification model may improve classification. The image classification result is based on an image feature of the image frame. The audio classification result is based on an audio feature of the audio. The textual description classification result is based on a text feature of the textual description information. A target classification result of the target video is determined based on to the image classification result, the audio classification result, and the textual classification result.

20 Claims, 9 Drawing Sheets

(51) Int. Cl.
- *G06F 18/2415* (2023.01)
- *G06F 18/2431* (2023.01)
- *G06F 40/279* (2020.01)
- *G06V 10/764* (2022.01)
- *G06V 10/80* (2022.01)
- *G06V 10/82* (2022.01)
- *G06V 20/40* (2022.01)
- *G06V 20/62* (2022.01)
- *G10L 25/24* (2013.01)
- *G10L 25/57* (2013.01)

(52) U.S. Cl.
CPC ........ *G06F 18/2431* (2023.01); *G06F 40/279* (2020.01); *G06V 10/764* (2022.01); *G06V 10/811* (2022.01); *G06V 10/82* (2022.01); *G06V 20/40* (2022.01); *G06V 20/41* (2022.01); *G06V 20/46* (2022.01); *G06V 20/635* (2022.01); *G10L 25/24* (2013.01); *G10L 25/57* (2013.01)

(58) Field of Classification Search
CPC .... G06V 10/764; G06V 10/811; G06V 10/82; G06V 20/40; G06V 20/41; G06V 20/46; G06V 20/635; G10L 25/24; G10L 25/57
USPC ........................................................ 382/162
See application file for complete search history.

(56) References Cited

FOREIGN PATENT DOCUMENTS

| | | | |
|---|---|---|---|
| CN | 108090203 A | | 5/2018 |
| CN | 109359636 A | | 2/2019 |
| CN | 111507097 B | * 8/2023 | ............ G06F 40/284 |

OTHER PUBLICATIONS

Williams, Jennifer, et al. "Dnn multimodal fusion techniques for predicting video sentiment." Proceedings of grand challenge and workshop on human multimodal language (Challenge-HML). 2018. (Year: 2018).*

International Search Report and Written Opinion received for Application No. PCT/CN2019/116660 posted Jan. 22, 2020 (Chinese language), (10 pages).

Office Action issued in related Chinese Patent Application No. 201811535837.0 dated Sep. 6, 2022, w/English translation, 17 pages.

Wang Peng et al., "Text-based Multi-Mode Feature Aggregation Algorithm for Video Classification," Journal of Tsinghua University, vol. 45, No. 4, May 20, 2012, 8 pages.

* cited by examiner

VIDEO CLASSIFICATION METHOD AND APPARATUS, COMPUTER DEVICE, AND STORAGE MEDIUM

RELATED APPLICATION

This application claims priority as a Continuation to PCT/CN2019/116660 filed on Nov. 8, 2019, which claims priority to Chinese Patent Application No. 201811535837.0, entitled "VIDEO CLASSIFICATION METHOD AND APPARATUS AND SERVER" and filed with the National Intellectual Property Administration, PRC on Dec. 14, 2018, both of which are incorporated herein by reference.

FIELD OF THE TECHNOLOGY

Embodiments of this application relate to video classification.

BACKGROUND OF THE DISCLOSURE

The recommendation function is used in video applications for recommending videos that users are interested in. The success of the recommendation function is closely related to the accuracy of video classification.

In the related art, videos may be classified using image recognition-based methods. In a video classification method based on image recognition, an image frame in a video is acquired, an image feature of the image frame is extracted, the image feature is inputted into a long short-term memory (LSTM) network according to a time sequence of the image frame, and a video class is determined according to an output of the LSTM network.

However, when video classification is performed based on an image feature, the single feature dimension can result in a poor video classification effect.

SUMMARY

According to embodiments provided in this application, a video classification method and apparatus, a computer device, and a storage medium are provided. Video classification accuracy can be improved by utilizing multiple features, including image, audio, and text. Classification based on a combination of an image classification model, an audio classification model, and a textual description classification model may improve classification. The image classification result is based on an image feature of the image frame. The audio classification result is based on an audio feature of the audio. The textual description classification result is based on a text feature of the textual description information. A target classification result of the target video is determined based on to the image classification result, the audio classification result, and the textual classification result.

A video classification method is provided. The method is performed by a computer device, and includes:
  obtaining a target video;
  classifying an image frame in the target video by using a first classification model, to obtain an image classification result, the first classification model being configured to perform classification based on an image feature of the image frame;
  classifying an audio in the target video by using a second classification model, to obtain an audio classification result, the second classification model being configured to perform classification based on an audio feature of the audio;
  classifying textual description information corresponding to the target video by using a third classification model, to obtain a textual classification result, the third classification model being configured to perform classification based on a text feature of the textual description information; and
  determining a target classification result of the target video according to the image classification result, the audio classification result, and the textual classification result.

A computing apparatus is provided. The apparatus comprises a processor and a memory, the memory storing computer-readable instructions, the computer-readable instructions, when executed by the processor, causing the processor to perform operations comprising:
  obtaining a target video;
  classifying an image frame in the target video by using a first classification model, to obtain an image classification result, the first classification model being configured to perform a classification based on an image feature of the image frame;
  classifying an audio in the target video by using a second classification model, to obtain an audio classification result, the second classification model being configured to perform a classification based on an audio feature of the audio;
  classifying textual description information corresponding to the target video by using a third classification model, to obtain a textual classification result, the third classification model being configured to perform a classification based on a text feature of the textual description information; and
  determining a target classification result of the target video based on the image classification result, the audio classification result, and the textual classification result.

A video classification apparatus is provided, and includes:
  a video obtaining module, configured to obtain a target video;
  a first classification module, configured to classify an image frame in the target video by using a first classification model, to obtain an image classification result, the first classification model being configured to perform classification based on an image feature of the image frame;
  a second classification module, configured to classify an audio in the target video by using a second classification model, to obtain an audio classification result, the second classification model being configured to perform classification based on an audio feature of the audio;
  a third classification module, configured to classify textual description information corresponding to the target video by using a third classification model, to obtain a textual classification result, the third classification model being configured to perform classification based on a text feature of the textual description information; and
  a target classification module, configured to determine a target classification result of the target video according to the image classification result, the audio classification result, and the textual classification result.

A computer device, including a processor and a memory, the memory storing computer-readable instructions, the computer-readable instructions, when executed by the processor, causing the processor to perform operations of the video classification method.

A non-transitory computer-readable storage medium stores computer-readable instructions, the computer-readable instructions, when executed by one or more processors, causing the one or more processors to perform operations of the video classification method.

Details of one or more embodiments of this application are provided in the accompanying drawings and description below. Other features, objectives, and advantages of this application become apparent from the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show only some embodiments of this application, and a person of ordinary skill in the art may still derive other accompanying drawings according to the accompanying drawings without creative efforts.

DESCRIPTION OF EMBODIMENTS

To make the objectives, technical solutions, and advantages of this application clearer, the following further describes implementations of this application in detail with reference to the accompanying drawings.

To facilitate understanding, the following explains terminology included in the embodiments of this application.

Convolutional layer: It is composed of a weight of a convolution kernel and a bias term. In a convolutional layer, convolution is performed on an output (also referred to as a feature map) of a last layer by using a convolution kernel, and a feature map of the output is obtained by using an activation function. The feature map may be represented as:

$$\text{map}_j^{(l+1)} = f\left(\sum_{i \in FM_l} \text{map}_i^{(l)} W_{ji}^{(l)} + b_j^{(l)}\right)$$

where $W_{ji}^{(l)}$ represents a weight parameter connecting an i unit of a first layer to a j unit of a $(1+1)^{th}$ layer, $b_j^{(l)}$ is a parameter corresponding to a connection between a bias unit of the first layer and the j unit of the $(1+1)^{th}$ layer, $FM_l$ is a feature map set of the first layer, and $\text{map}_i^{(l)}$ represents an $i^{th}$ feature map of the first layer.

Pooling layer: It is a layer on which downsampling is performed, and common pooling manners include maximum pooling, sum pooling, and mean pooling.

Mel-frequency cepstral coefficient (MFCC): It is used for representing distribution of energy of a speech signal in different frequency ranges. When the MFCC is calculated, pre-emphasis, framing, windowing, fast Fourier transformation (FFT), Mel filter bank, and discrete cosine transform (DCT) usually need to be performed on an audio.

Long-short term memory (LSTM): It is a recurrent neural network (RNN), applicable to process and predict important events with a quite long interval and delay in a time sequence. A Bi-directional long short-term memory network (Bi-LSTM) is a network implementing bi-directional memory based on the LSTM. The LSTM may be for forward memory, while the Bi-LSTM may implement both forward memory and reversed module memory.

Figure 1:
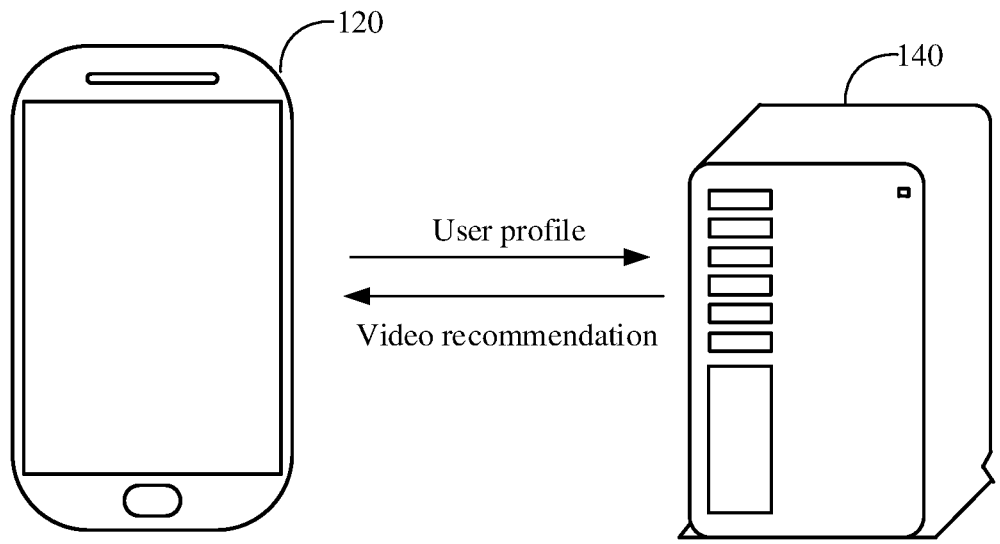
FIG. 1 is a schematic diagram of an implementation environment according to an embodiment of this application.

FIG. 1 shows a schematic diagram of an implementation environment according to an embodiment of this application. The implementation environment includes a terminal 120 and a server 140.

The terminal 120 is an electronic device having a video playback function, and the electronic device may be a smartphone, a tablet computer, a personal computer, or the like. In FIG. 1, description is made by using an example in which the terminal 120 is a smartphone.

In this embodiment of this application, the video playback function of the terminal 120 may be implemented by a third-party application, and the third-party application may be a video playback application, a page viewing application, a news reading application, a short video application, or the like. This is not limited in the embodiments of this application.

Apart from the video playback function, in one embodiment, the terminal 120 further has a video uploading function. By using the video uploading function, the terminal 120 may upload a recorded video, or, a locally stored video to a server 140. In addition, the server 140 may share and push the received video to another terminal for playing.

The terminal 120 is connected to the server 140 through a wired or wireless network.

The server 140 is one server, a server cluster formed by several servers, or a cloud computing center. In this embodiment of this application, the server 140 may be a backend server of the third-party application in the terminal 120, configured to recommend a video that a user is interested in to the terminal 120.

The server 140 in this embodiment of this application has a video classification function. By using the video classification function, the server 140 classifies, according to preset classes, a video (which may be a video acquired by the server from a network, or may be a video uploaded by the terminal 120) into at least one class of the preset classes, and performs video recommendation based on a class corresponding to each video subsequently.

In one embodiment, the server 140 further has a function of generating a user profile. The user profile is generated according to a historical video viewing record of a user, and is used for describing video viewing preferences of the user. In the subsequent video recommendation, the server 140 performs the video recommendation according to a class corresponding to the video and the user profile.

In one embodiment, a standard communication technology and/or protocol is used for the wireless network or the wired network described above. The network is generally the Internet, but may be any other network, including but not limited to a local area network (LAN), a metropolitan area network (MAN), a wide area network (WAN), a mobile, wired, or wireless network, or any combination of a dedicated network or a virtual private network). In some embodiments, technologies and/or formats, such as hypertext markup language (HTML) and extensible markup language (XML), are used for representing data exchanged through a network. In addition, all or some links may be encrypted by using conventional encryption technologies such as secure socket layer (SSL), transport layer security (TLS), virtual private network (VPN), and Internet protocol security (IPsec). In some other embodiments, custom and/or dedicated data communication technologies may also be used in place of or in addition to the foregoing data communication technologies.

A video classification method provided in the embodiments of this application is performed by the server 140 in FIG. 1.

The video classification method provided in the embodiments of this application is applicable to a scenario where video classes need to be applied, such as a video recommendation scenario or a user profile constructing scenario. Different scenarios where the video classification method is applied are described below.

Video Recommendation Scenario

Figure 2:
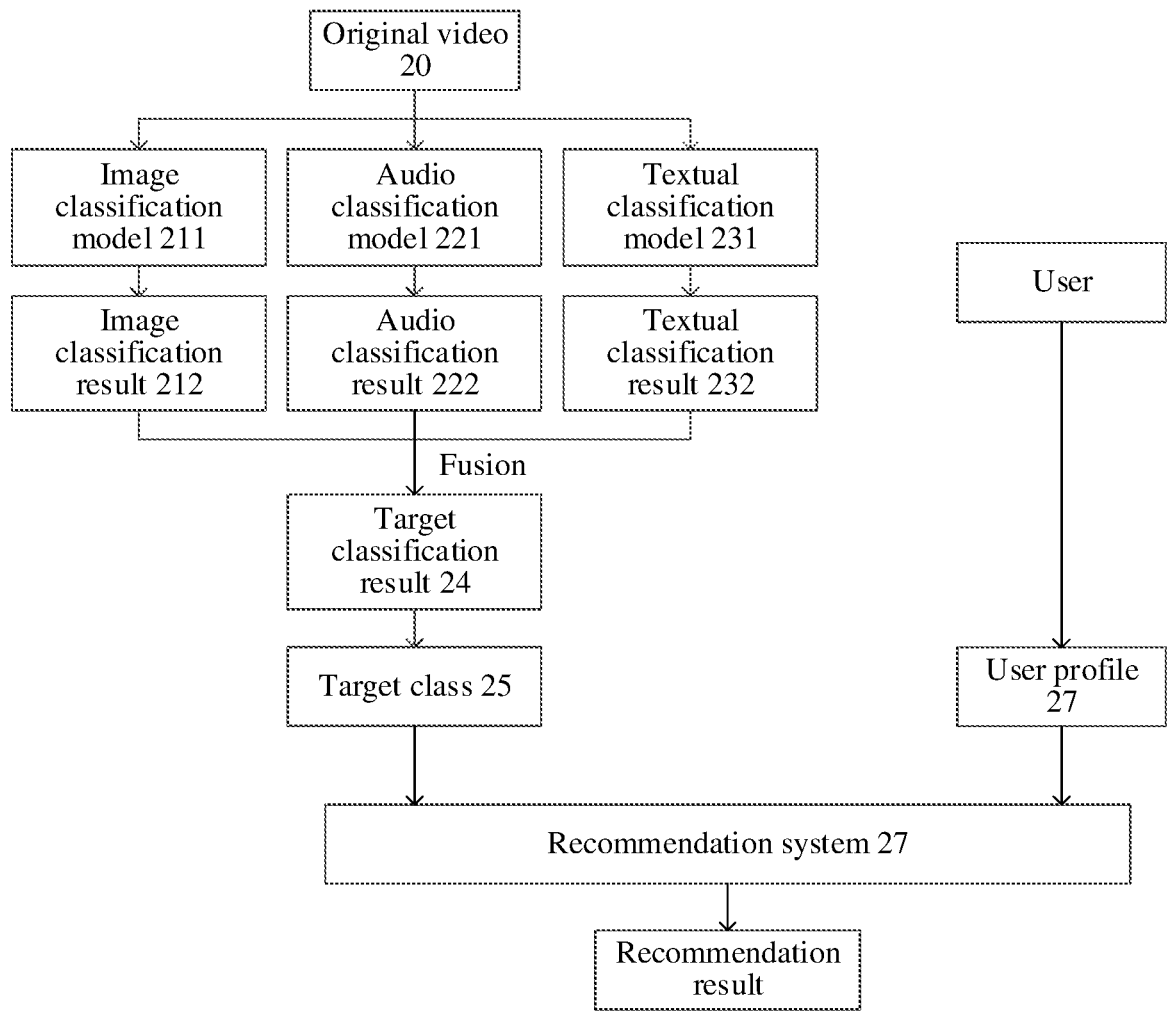
FIG. 2 is a schematic flowchart of a computer device performing video recommendation according to an embodiment.

In the video recommendation scenario, as shown in FIG. 2, for a to-be-classified original video 20 (locally stored by the server or uploaded by a terminal), the server first performs, from an image dimension, an audio dimension, and a text dimension, image feature extraction and classification on an image frame of the original video 20 by using an image classification model 211, to obtain an image classification result 212; performs audio feature extraction and classification on an audio of the original video 20 by using an audio classification model 221, to obtain an audio classification result 222; and performs text feature extraction and classification on textual description information of the original video 20 by using a textual classification model 231, to obtain a textual classification result 232. Further, the server fuses the image classification result 212, the audio classification result 222, and the textual classification result 232, to obtain a target classification result 24 of the original video 20, further determines a target class 25 of the original video 20 according to a probability corresponding to each of classes indicated by the target classification result 24, and stores the original video 20 in association with the target class 25.

During video recommendation, a recommendation system 26 of the server obtains a user profile 27 of a current user (which may be generated according to a historical viewing record of the user), to recommend a video matching a video class that is indicated by the user profile 27 and that the user is interested in to the user.

User Profile Constructing Scenario

In the field of video recommendation, a user profile is used for describing video watching preferences of a user, and the accuracy of the user profile is closely related to the accuracy of video classification. To improve the accuracy of the user profile, so as to improve the accuracy of subsequent video recommendation, the server first performs multi-dimensional classification on an original video from an image dimension, an audio dimension, and a text dimension, and then comprehensively determines a target class of the original video according to classification results of the original video in different dimensions.

When constructing the user profile, the server obtains an operation behavior (for example, viewing or ignoring) of the user on a recommended video, thereby determining, according to the operation behavior, a preference degree of the user for a video class corresponding to the recommended video, and constructing the user profile on the basis of the preference degree corresponding to the video class, for use in subsequent video recommendation.

In addition to the foregoing application scenarios, the video classification method provided in the embodiments of this application is further applicable to another scenario where a video class is applied, such as a video integration scenario (integrating the same type of videos based on video classes), or a video searching scenario (feeding back a video of a corresponding video class based on a searched keyword). A specific application scenario is not limited in the embodiments of this application.

In the related art, when the server performs video classification only based on an image feature of a video, the effect of classifying videos which have similar pictures but differ greatly in audio is poor. For example, when classification is performed based on an image feature of a video, because image features of a self-photographing video and a self-photographing video with funny dubbing are similar, the self-photographing video and the self-photographing video with funny dubbing are classified as "self-photographing". However, in an actual situation, the self-photographing video with funny dubbing shall be classified as "funny".

However, in the embodiments of this application, the server performs video classification by using an audio feature and a text feature in addition to an image feature, which can compensate for limitations of video classification only based on an image feature, thereby improving the accuracy of video classification, which is particularly obvious when videos that have similar pictures but differ greatly in audio or text are classified. A schematic embodiment is provided below for description.

Figure 3:
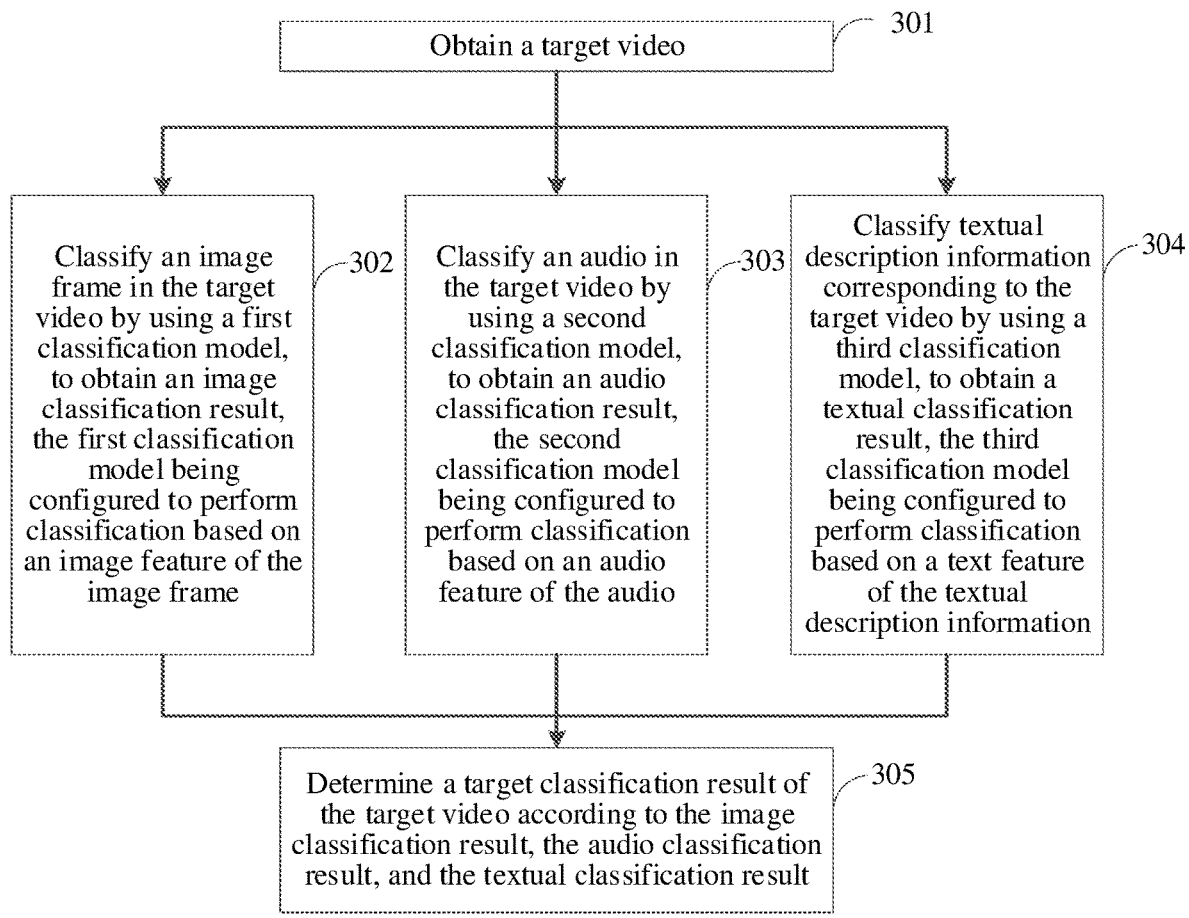
FIG. 3 is a flowchart of a video classification method according to an embodiment of this application.

FIG. 3 is a flowchart of a video classification method according to an embodiment of this application. This embodiment is described by using an example in which the method is applied to the server 140 in FIG. 1. The method may include the following steps:

Step 301. Obtain a target video.

The target video is a video pulled by the server from a network, or a video uploaded by a terminal. A source of the target video is not limited in the embodiments of this application.

In an exemplary application scenario, the server is a backend server of the short video application, and the target video is a video recorded by a user by using the short video application.

The server performs image feature extraction and classification, audio feature extraction and classification, and text feature extraction and classification on the obtained target video by using the following step 302 to step 304. There is no strict sequence from step 302 to step 304. This embodiment of this application is described by using an example in which step 302 to step 304 are performed at the same time.

Step 302. Classify an image frame in the target video by using a first classification model, to obtain an image classification result, the first classification model being configured to perform classification based on an image feature of the image frame.

In a possible implementation, the first classification model includes a deep learning network for extracting an image feature and a classifier for classification based on an image feature. Correspondingly, after extracting an image frame from the target video, the server inputs the image frame to the first classification model, and an image feature of the image frame is extracted by using the deep learning network in the first classification model, and further the image feature is classified by using the classifier, to obtain an image classification result.

The image classification result includes various preset classes and probabilities corresponding to the preset classes, and the preset classes are classes of videos obtained through classification in advance. For example, the preset class includes at least one of the following: self-photographing, funny, animation, game, dubbing, basketball, soccer, variety show, and movie.

In one embodiment, the first classification model is trained based on a sample image frame marked with a sample class.

Step 303. Classify an audio in the target video by using a second classification model, to obtain an audio classification result, the second classification model being configured to perform classification based on an audio feature of the audio.

In a possible implementation, the second classification model includes a neural network (for example, an LSTM) for extracting an audio feature and a classifier for classification based on an audio feature. Correspondingly, after extracting an audio of the target video, the server inputs the audio to the second classification model, and an audio feature of the audio is extracted by using the neural network in the second classification model, and further the audio feature is classified by using the classifier to obtain an audio classification result.

The audio classification result includes various preset classes and probabilities corresponding to the preset classes, and the preset classes are classes of videos obtained through classification in advance.

In one embodiment, the second classification model is trained based on a sample audio marked with a sample class.

Step 304. Classify textual description information corresponding to the target video by using a third classification model, to obtain a textual classification result, the third classification model being configured to perform classification based on a text feature of the textual description information.

In a possible implementation, the third classification model includes a neural network (for example, an LSTM) for extracting a text feature and a classifier for classification based on a text feature. Correspondingly, after extracting textual description information of the target video, the server inputs the textual description information to the third classification model, and a text feature of the textual description information is extracted by using the neural network in the third classification model, and further the text feature is classified by using the classifier, to obtain a textual classification result.

The textual classification result includes various preset classes and probabilities corresponding to the preset classes, and the preset classes are classes of videos obtained through classification in advance.

In one embodiment, the textual description information includes at least one of a video title, video content description information, video background music information, and video publisher information of the target video.

In one embodiment, the second classification model is trained based on sample text marked with a sample class.

Step 305. Determine a target classification result of the target video according to the image classification result, the audio classification result, and the textual classification result.

After obtaining the classification results based on different dimensions, the server further fuses the image classification result, the audio classification result, and the textual classification result, and finally determines a target classification result of the target video.

In a possible implementation, the server inputs the fused classification result to a pretrained classifier, to obtain a target classification result outputted by the classifier.

In one embodiment, because there are usually a plurality of preset classes of videos, and different classes are mutually exclusive, classification models and a classifier used for classifying a fused classification result may be a softmax classification model. In one embodiment, a hypothesis function of the softmax classification model is as follows:

$$h_\theta(x) = \frac{1}{1 + \exp(-\theta^T x)}$$

where exp( ) is an exponent using a natural constant e as a base, $\theta$ is a model training parameter, and T represents transposition.

Correspondingly, when the softmax classification model is optimized, a used cost function is as follows:

$$J(\theta) = -\frac{1}{m}\left[\sum_{i=1}^{m} y^{(i)} \log h_\theta(x^{(i)}) + (1 - y^{(i)}) \log(1 - h_\theta(x^{(i)}))\right]$$

where $x^{(i)}$ is an input parameter, $y^{(i)}$ is an output parameter, and m is a quantity of training samples in a training set.

A process of optimizing the softmax classification model is a process of minimizing the cost function. Details described throughout this specification apply in this and other embodiments of this application.

In one embodiment, the target classification result includes probabilities corresponding to at least two preset classes. The server determines n preset classes with the highest probability as target classes of the target video, where n is an integer greater than or equal to 1.

In an exemplary example, when classification is performed based on an image feature of a video, because image features of a self-photographing video A and a self-photographing video B with funny dubbing are similar, a probability corresponding to "self-photographing" in the image classification result is relatively high. When classification is performed based on an audio feature of a video, because there is a relatively large difference between audios of the self-photographing video A and the self-photographing video B, and the audio of the self-photographing video B has features of a funny audio, a probability that the self-photographing video A corresponds to "self-photographing" in the audio classification result is relatively high, while a probability that the self-photographing video B corresponds to "funny" in the audio classification result is relatively high. When classification is performed based on a text feature of a video, because there is a relatively large difference between textual description information of the self-photographing video A and the self-photographing video B, and the textual description information of the self-photographing video B has features of a funny textual description, a probability that the self-photographing video A corresponds to "self-photographing" in the textual classification result is relatively high, while a probability that the self-photographing video B corresponds to "funny" in the textual classification result is relatively high. Finally, the server fuses classification results of the self-photographing video A, determines a target class of the self-photographing video A as "self-photographing", fuses classification results of the self-photographing video B, and determines a target class of the self-photographing video B as "funny".

Classifying a video by using an audio feature and a text feature in addition to an image feature can improve the accuracy of video classification by using complementarity between different modalities (an image modality, an audio modality and a text modality) of the video.

In this embodiment of the application, after the to-be-classified target video is obtained, the image frame is classified by using the first classification model to obtain the image classification result, the audio is classified by using the second classification model to obtain the audio classification result, and the textual description information is classified by using the third classification model to obtain the textual classification result, thereby determining the target classification result of the target video according to the image classification result, the audio classification result, and the textual classification result. Compared with the related art in which video classification is performed only based on an image feature of a video, in this embodiment of this application, classification is performed based on the image feature, the audio feature, and the text feature of the video comprehensively, and the features in different dimensions of the video are fully considered, thereby improving the accuracy of video classification.

In one possible implementation, a process of determining a target classification result of the target video according to classification results in different dimensions may include the following steps.

1. Splice probabilities corresponding to classes in the image classification result, the audio classification result, and the textual classification result, to generate a classification feature vector.

In one embodiment, the server splices, according to a predetermined sequence, probabilities corresponding to classes in the image classification result, the audio classification result, and the textual classification result, to obtain a classification feature vector. The predetermined sequence is a sequence of the image classification result, the audio classification result, and the textual classification result.

In an exemplary example, if preset classes of videos are self-photographing, game, sport, makeup, and funny, and an image classification result is (self-photographing (0.95), game (0.01), sport (0.01), makeup (0.02), and funny (0.01)), an audio classification result is (self-photographing (0.05), game(0.01), sport (0.01), makeup (0.03), and funny (0.90)), and a textual classification result is (self-photographing (0.1), game (0.01), sport (0.01), makeup (0.03), and funny (0.85)), a classification feature vector generated by the server is (0.95, 0.01, 0.01, 0.02, 0.01, 0.05, 0.01, 0.01, 0.03, 0.90, 0.1, 0.01, 0.01, 0.03, 0.85).

2. Input the classification feature vector to a target classifier, to obtain the target classification result, the target classifier being constructed based on a softmax classification model.

In one embodiment, the server constructs an original softmax classification model in advance, and trains the original softmax classification model according to a sample classification feature vector marked with a video class, to obtain a target classifier. During video classification, the server inputs a generated classification feature vector into the target classifier, to obtain a target classification result outputted by the target classifier.

Figure 4:
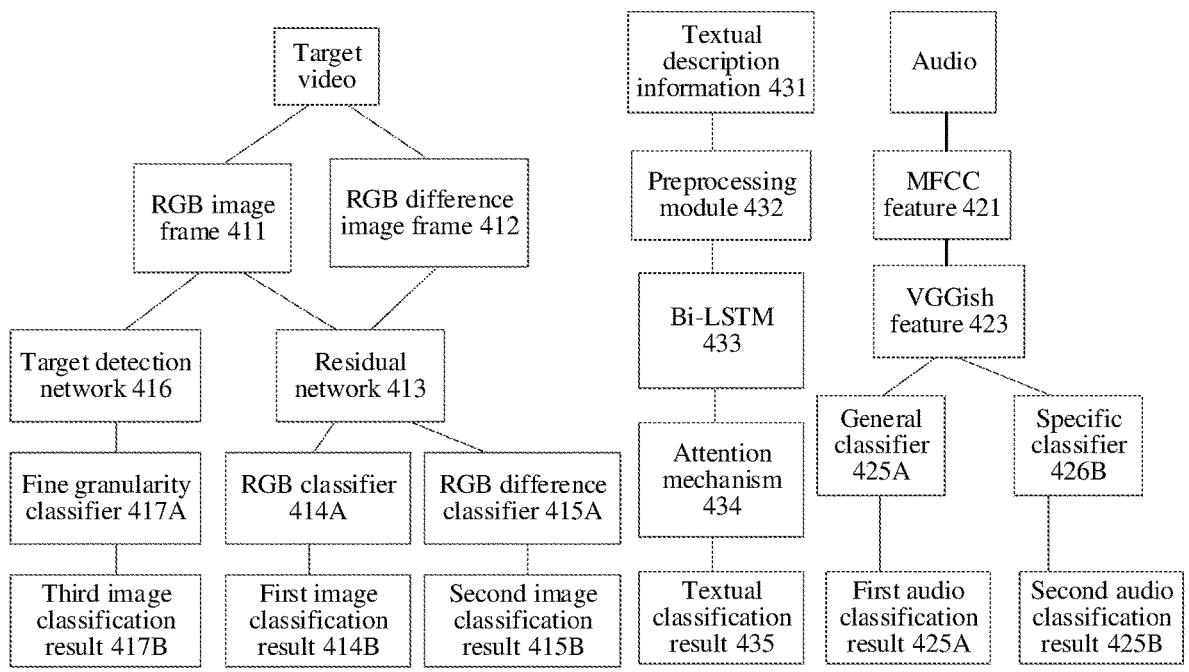
FIG. 4 is a schematic principle diagram of a video classification process according to an embodiment.
Figure 5:
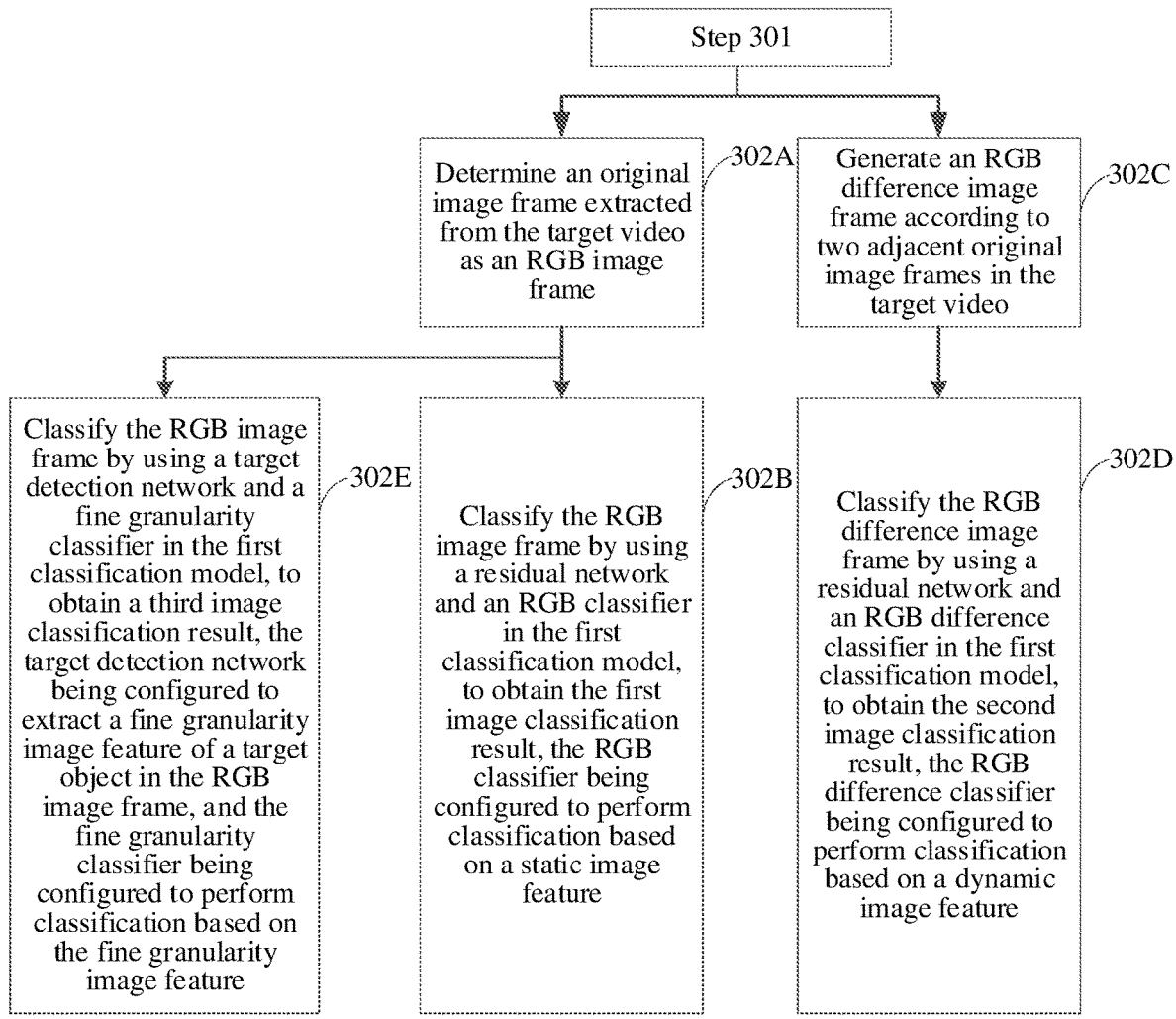
FIG. 5 is a flowchart of a video classification process based on an image frame according to an embodiment.

In a possible implementation, As shown in FIG. 4, before image feature extraction and classification are performed on an image frame, the server first extracts an RGB image frame 411 and an RGB difference image frame 412 from the target video, and separately inputs the RGB image frame 411 and the RGB difference image frame 412 to a residual network (ResNet) 413 for feature extraction, so that an image feature extracted from the RGB image frame 411 is inputted to an RGB classifier 414A to obtain a first image classification result 414B, and an image feature extracted from the RGB difference image frame 412 is inputted to an RGB difference classifier 415A to obtain a second image classification result 415B. As shown in FIG. 5, step 302 may include the following steps:

Step 302A. Determine an original image frame extracted from the target video as an RGB image frame.

A large quantity of computing resources need to be consumed in subsequent image feature extraction, and differences between adjacent image frames in the video are relatively small. Therefore, to reduce a calculation amount, in a possible implementation, the server extracts an original image frame from the target video according to a predetermined sampling interval, and determines the extracted original image frame as an RGB image frame. For example, the predetermined sampling interval is one second (1s), that is, the server extracts one original image frame at an interval of 1s.

In another possible implementation, the server may also dynamically determine the sampling interval according to a video length of the target video. The sampling interval has a positive correlation with the video length, that is, when the video is longer, the sampling interval is longer. A specific manner of extracting the original image frame is not limited in this application.

Step 302B. Classify the RGB image frame by using a residual network and an RGB classifier in the first classification model, to obtain the first image classification result, the RGB classifier being configured to perform classification based on a static image feature.

In one embodiment, in this embodiment of this application, the first classification model includes a pre-trained residual network and an RGB classifier. After extracting the RGB image frame, that is, a (static) image feature of the RGB image frame is extracted by using the residual network, the server further classifies the (static) image feature by using the RGB classifier, to obtain the first image classification result indicating a class to which the RGB image frame belongs. Classes in the first image classification result are the same as the preset classes.

Another deep convolutional neural network, such as an initial residual network (Inception-ResNet), may be used as the residual network and A softmax classification model may be used as the RGB classifier. This is not limited in the embodiments of this application.

Figure 6:
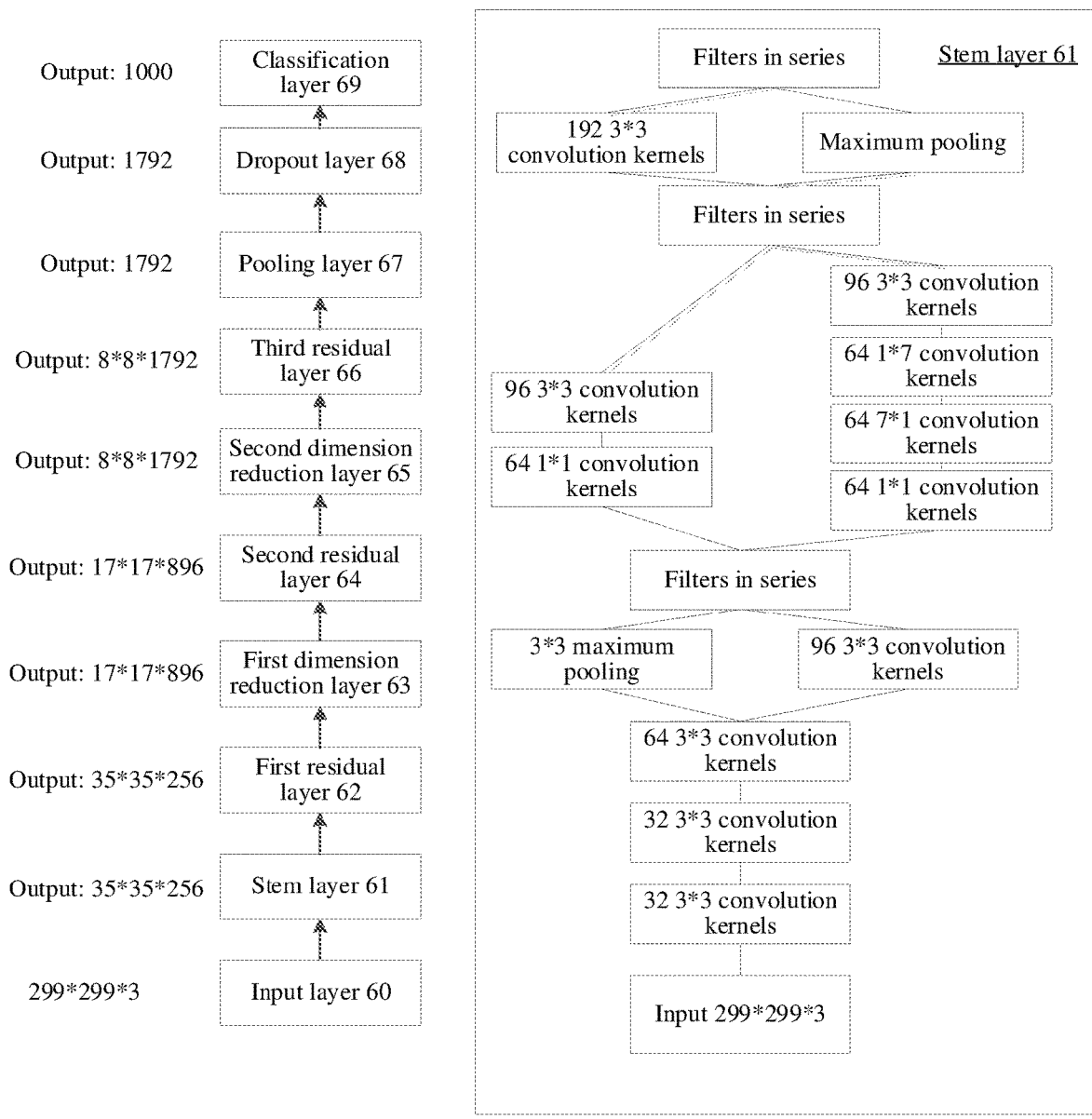
FIG. 6 is a schematic structural diagram of an initial residual network and a Stem layer in the initial residual network according to an embodiment.

In an exemplary example, a structure of a residual network (Inception-ResNet-v2) is shown in FIG. 6. The residual network includes an input layer 60, a Stem layer 61, a first residual layer 62, a first dimension reduction layer 63, a second residual layer 64, a second dimension reduction layer 65, a third residual layer 66, a pooling layer 67, a dropout layer 68, and a classification layer 69.

The input layer 60 is used for inputting an image frame. For the RGB image frame, the server forms one-dimensional array by using pixel values of three channels, R, G, and B, in the RGB image frame, and then inputs the one-dimensional array to the input layer 60. As shown in FIG. 6, data received by the input layer 60 is 299 (a length of the RGB image frame) multiplied by 299 (a width of the RGB image frame) multiplied by 3 (a quantity of channels).

The Stem layer 61 is used for preprocessing data, and includes a plurality of convolution operations and two pooling operations. During convolution, a form of (7*1+ 1*7) optimization convolution is used, and a parallel structure of "convolution+pooling" is used during pooling, to avoid a bottleneck problem.

The first residual layer 62 includes five residual blocks (for performing convolution), the second residual layer 64 includes 10 residual blocks, and the third residual layer 66 includes five residual blocks.

The first dimension reduction layer 63 is used for performing dimension reduction on an output of the first residual layer 62, and the second dimension reduction layer 65 is used for performing dimension reduction on an output of the second residual layer 64, to reduce a calculation amount.

The pooling layer 67 is used for performing downsampling on an output of the third residual layer 66, and mean pooling is used in the pooling layer 67 herein.

The dropout layer 68 is used for setting a part of input data to 0 according to a keep parameter, to avoid overfitting. For example, when the keep parameter is 0.8, 20% of data in the input data is set to 0 at the dropout layer 68.

Step 302C. Generate an RGB difference image frame according to two adjacent original image frames in the target video.

In the foregoing steps, the RGB image frame can only reflect static image features of video pictures. Therefore, to improve the effect of image classification, the server further performs classification based on dynamic image features of the video pictures.

The RGB difference image frame is generated by performing a subtraction operation (subtract RGB pixel values) on two adjacent original image frames, is used for representing a difference between two original image frames, and may be represented as:

$$rgbdiff_t = rgb_{t+1} - rgb_t$$

where $rgbdiff_t$ is an RGB difference image frame, $rgb_{t+1}$ is an original image frame at a moment (t+1), $rgb_t$ is an original image frame at a moment t, and the moment t and the moment (t+1) are sampling moments.

Using a pixel in the image frame as an example, a pixel value $rgb_t$ of the pixel at the moment t is (100, 100, 100), a pixel value $rgb_{t+1}$ of the pixel at the moment (t+1) is (150, 160, 170), and calculated $rgbdiff_t$ is (50, 60, 70).

The RGB difference image frame can reflect a difference between two original image frames, and thus, image feature extraction is performed on the RGB difference image frame, to obtain a dynamic image feature of the target video.

Step 302D. Classify the RGB difference image frame by using a residual network and an RGB difference classifier in the first classification model, to obtain the second image classification result, the RGB difference classifier is configured to perform classification based on a dynamic image feature.

In one embodiment, the first classification model includes a pre-trained residual network and an RGB difference classifier. After generating the RGB difference image frame, that is, (dynamic) an image feature of the RGB difference image frame is extracted by using the residual network, the server further classifies the (dynamic) image feature by using the RGB difference classifier, to obtain the second image classification result indicating a class to which the RGB difference image frame belongs. Classes in the second image classification result are the same as the preset classes.

Image feature extraction may be performed on the RGB image frame and the RGB difference image frame by using a same residual network or different residual networks. This is not limited in this application.

In this embodiment, the server performs classification based on the RGB image frame and the RGB difference image frame, which comprehensively considers the static image feature and the dynamic image feature, thereby improving the comprehensiveness of subsequent image dimension classification.

In the foregoing embodiments, when feature extraction is performed on the RGB image frame or the RGB difference image frame, only a global feature of the image is obtained (that is, the entire image is concerned). Correspondingly, a classifier used subsequently can only perform classification based on the global feature of the image. To further improve the accuracy of the image classification result, in this embodiment of this application, when the server performs image feature extraction, not only the entire image is concerned, but also a specific target in the image is concerned, and classification is performed based on a detection result of the specific target in the image.

As shown in FIG. 4, after extracting the RGB image frame 411 from the target video, the server further inputs the RGB image frame 411 to a target detection network 416 to extract a fine granularity feature, and inputs the extracted fine granularity image feature to a fine granularity classifier 417A to obtain a third image classification result 417B. As shown in FIG. 5, after step 302A, the following steps may further be included.

Step 302E. Classify the RGB image frame by using a target detection network and a fine granularity classifier in the first classification model, to obtain a third image classification result, the target detection network being configured to extract a fine granularity image feature of a target object in the RGB image frame, and the fine granularity classifier being configured to perform classification based on the fine granularity image feature.

In this embodiment of this application, the first classification model further includes a target detection network and a fine granularity classifier. The target detection network may be a region-based convolutional neural network (RCNN) (including a Fast RCNN and a Faster RCNN), a YOLO (You Only Look Once) network, or a single shot multibox detector (SSD) network. A specific type of the target detection network is not limited in this embodiment.

In a possible implementation, when the target detection network is used for target detection, the target detection network can detect target information in the RGB image frame, for example, a type of a target object, a position of a target frame, and a confidence level, to determine a fine granularity feature of the RGB image frame according to the target information. In one embodiment, the fine granularity feature includes:
1. Whether the target object appears in the RGB image frame: 0 represents that the target object does not appear in the RGB image frame, and 1 represents that the target object appears in the RGB image frame.
2. A proportion of an area of the target object: a maximum proportion of a target frame corresponding to the target object to the RGB image frame.
3. A relative displacement of the target object: a displacement of a center point of the target frame corresponding to the target object in two adjacent RGB image frames.

Figure 7:
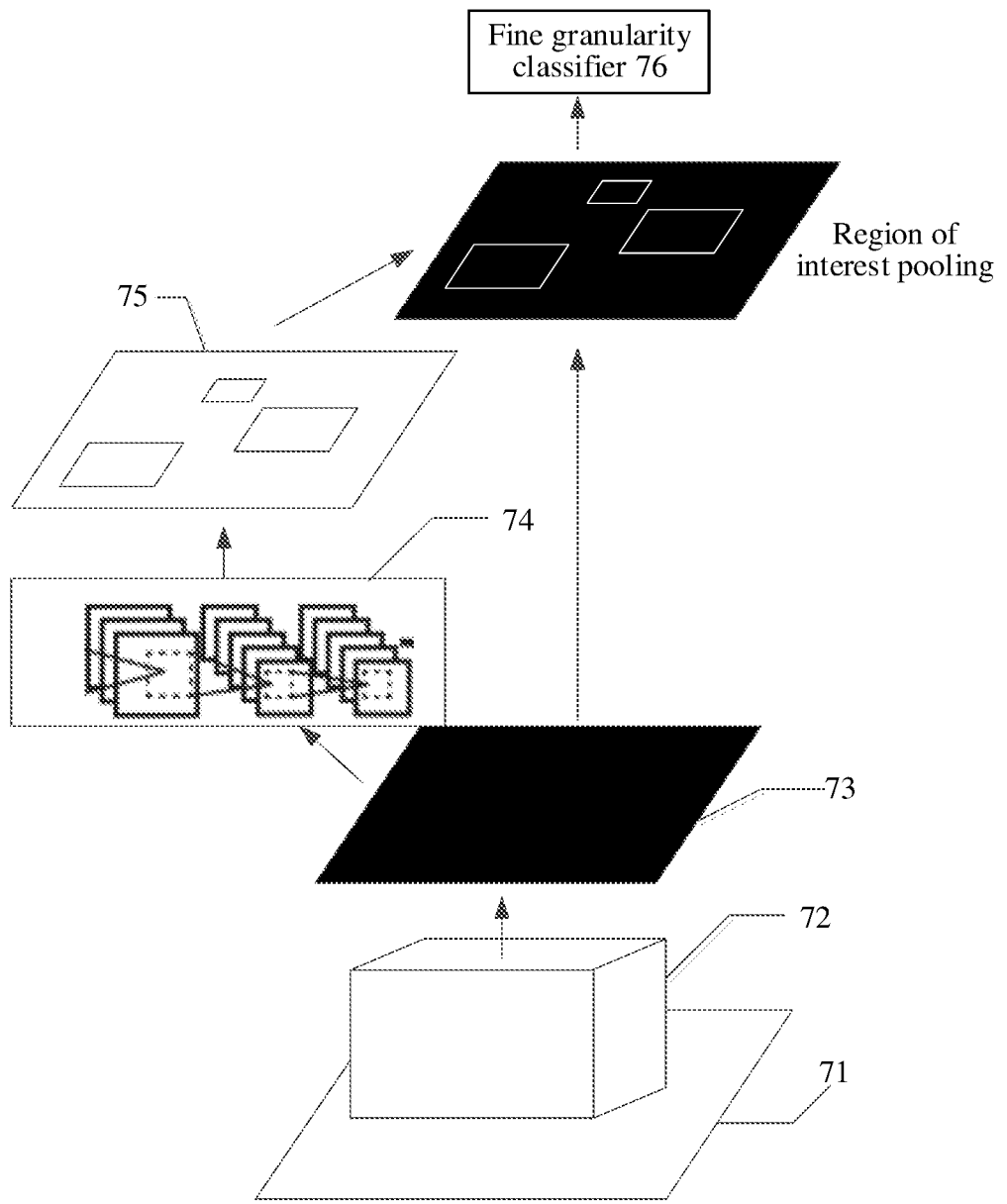
FIG. 7 is a schematic structural diagram of a target detection network according to an exemplary embodiment.

In an exemplary example, as shown in FIG. 7, when the target detection network is a Faster-RCNN, convolution is first performed on an RGB image frame 71 in a convolutional layer 72, and a feature map 73 used for representing image features is outputted. After the feature map 73 is inputted to a region prediction network 74 (for predicting a region of the target object in the image), the region prediction network 74 outputs a prediction map 75. Further, region of interest pooling (RoI pooling) is performed on an image obtained by fusing the prediction map 75 and the feature map 73, a fine granularity feature of the RGB image frame 71 is determined, and further the fine granularity feature is classified by using a fine granularity classifier 76, to obtain a third image classification result.

In this embodiment, when extracting the global feature of the image, the server extracts a fine granularity image feature of the RGB image frame by using the target detection network, fuses the extracted fine granularity image feature and the global feature, and performs classification, thereby improving the accuracy and comprehensiveness of the image classification result.

Figure 8:
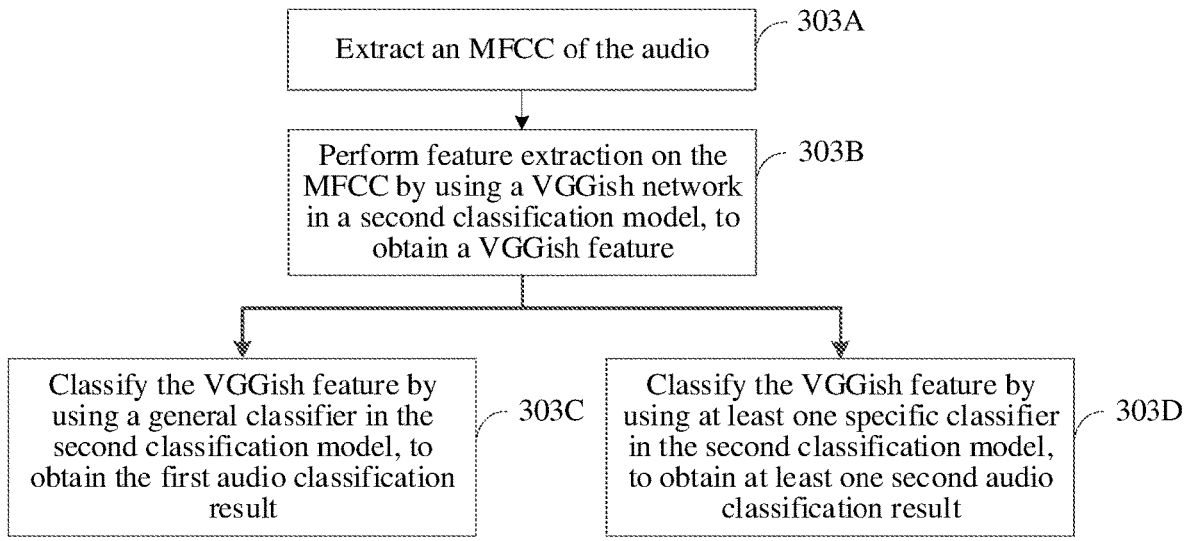
FIG. 8 is a flowchart of a video classification process based on an audio according to an embodiment.

In a possible implementation, as shown in FIG. 4, when audio feature extraction and classification are performed on the audio of the target video, the server first extracts an MFCC feature 421 of the audio, and then performs feature extraction on the MFCC feature 421 by using a VGGish network 422, to obtain a VGGish feature 423. Further, the server classifies the VGGish feature 423 separately by using a general classifier 425A and a specific classifier 426B, to finally obtain a first audio classification result 425A and a second audio classification result 425B. As shown in FIG. 8, step 303 may include the following steps:

Step 303A. Extract an MFCC of the audio.

In a possible implementation, the server separates the audio from the target video, and then performs sampling on the audio according to predetermined sampling frequency, so that pre-emphasis, framing, windowing, FFT, Mel filter bank and DCT are performed on a sampling result, to obtain an MFCC of the audio.

Step 303B. Perform feature extraction on the MFCC by using a VGGish network in a second classification model, to obtain a VGGish feature.

In one embodiment, the second classification model includes a VGGish network for feature extraction and a double-layer classifier for classification. For the extracted MFCC, the server inputs the MFCC to the VGGish network, to obtain a VGGish feature outputted by the VGGish network.

The VGGish network may use an existing network structure. A specific structure of the VGGish network is not limited in the embodiments of this application.

Schematically, when the audio of the target video is 60s, and the sampling frequency is 128 Hz, a feature of 128*60 dimensions may be extracted by using the VGGish network.

Step 303C. Classify the VGGish feature by using a general classifier in the second classification model, to obtain the first audio classification result.

Step 303D. Classify the VGGish feature by using at least one specific classifier in the second classification model, to obtain at least one second audio classification result.

In this embodiment of this application, the second classification model includes a general classifier and at least one specific classifier, a quantity of classes in the general classifier being the same as a quantity of preset classes for videos, the specific classifier being configured to perform classification based on a specific class, the specific class being one of the preset classes for videos, and different specific classifiers being corresponding to different specific classes.

Schematically, when the preset classes for videos include five classes (which are respectively self-photographing, game, sport, makeup, and funny), the classes of the general classifier are also the foregoing five classes, and the specific classifier performs classification based on a specific class in the five classes. For example, the specific classifier is configured to perform classification based on the class of "funny", that is, videos are classified as funny videos and non-funny videos.

In one embodiment, the specific classes are classes significantly distinct from each other in an audio modality.

In a possible implementation, compared with a non-funny video, an audio of a funny video usually includes laughter (that is, a difference between the funny video and the non-funny video in the audio modality lies in whether laughter is included), and thus, the server pre-trains a specific classifier configured to classify a funny video and non-funny video, so that when performing classification by using the general classifier, the server also classifies whether the video is a funny video or a non-funny video by using the specific classifier.

The server may set a plurality of specific classifiers in the second classification model, to further improve the accuracy of the audio classification result. This embodiment merely describes by using an example in which one specific classifier is set, but does not constitute limitation on this.

In this embodiment, based on the general classifier, a specific classifier configured to distinguish a specific class is added, to enrich dimensions during audio classification, thereby improving the accuracy and comprehensiveness of the audio classification result.

Figure 9:
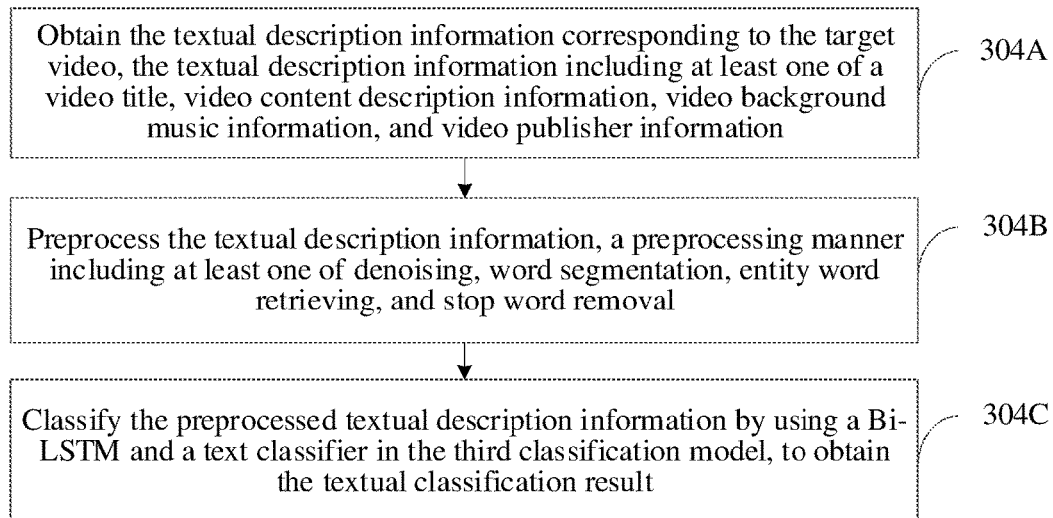
FIG. 9 is a flowchart of a video classification process based on textual description information according to an embodiment.

In a possible implementation, as shown in FIG. 4, when performing text feature extraction and classification on textual description information of the target video, the server first obtains textual description information 431 of the target video, and then pre-processes the textual description information 431 by using a preprocessing module 432. Further, a text feature is extracted from the preprocessed textual description information 431 by using a Bi-LSTM 433 and an attention mechanism 434, and further, the text feature is classified by using a text classifier, to finally obtain a textual classification result 435. As shown in FIG. 9, step 304 may include the following steps:

Step 304A. Obtain the textual description information corresponding to the target video, the textual description information including at least one of a video title, video content description information, video background music information, and video publisher information.

In a possible implementation, video data of the target video is stored in association with the textual description information. When obtaining the target video, the server also obtains the textual description information stored in association with the target video from a database, where the textual description information includes at least one of a video title, video content description information, video background music information, and video publisher information.

Schematically, the textual description information obtained by the server includes a video title of "Challenge to eat 100 steamed stuffed buns", video content description information of "Host Big eater goes beyond himself today, challenging to rapidly eat 100 steamed stuffed buns", video background music of "song A", and video publisher information of "Big eater A Wei".

Step 304B. Preprocess the textual description information, a preprocessing manner including at least one of de-noising, word segmentation, entity word retrieving, and stop word removal.

To improve the accuracy of subsequent classification, the server needs to preprocess the textual description information. The textual description information may be preprocessed in the following manners:

1. De-noising: removing noise information interfering with classification in the textual description information. For example, for the video background music information in the textual description information, if the video background music information is not included in a background music library, a field of "user uploaded" is usually added to the video background music information, the type of field interferes with subsequent classification, and thus the type of field needs to be removed.
2. Word segmentation: dividing a long sentence in the textual description information into words of fine granularity, and performing statistical modeling on occurrence frequencies of the words after division.
3. Entity word retrieving: extracting an entity word in the textual description information based on a preset entity word list, so that the entity word is divided into a plurality of words during word segmentation.
4. Stop word removal: removing meaningless modal particles (for example, "ah", "wow", and "oh"), pronouns (for example, "you", "I", and "he"), auxiliary verbs (for example, "have" and "could"), punctuations (for example, "," and ".") and numbers in the textual description information.

Step 304C. Classify the preprocessed textual description information by using a Bi-LSTM and a text classifier in the third classification model, to obtain the textual classification result.

In a possible implementation, before inputting the preprocessed textual description information to the third classification model, the server converts the preprocessed textual description information (formed by words) into a word vector, and further inputs the word vector to the third classification model. The words may be converted into the word vector by using a mature word vector model, such as word2vec. This is not limited in this embodiment.

Figure 10:
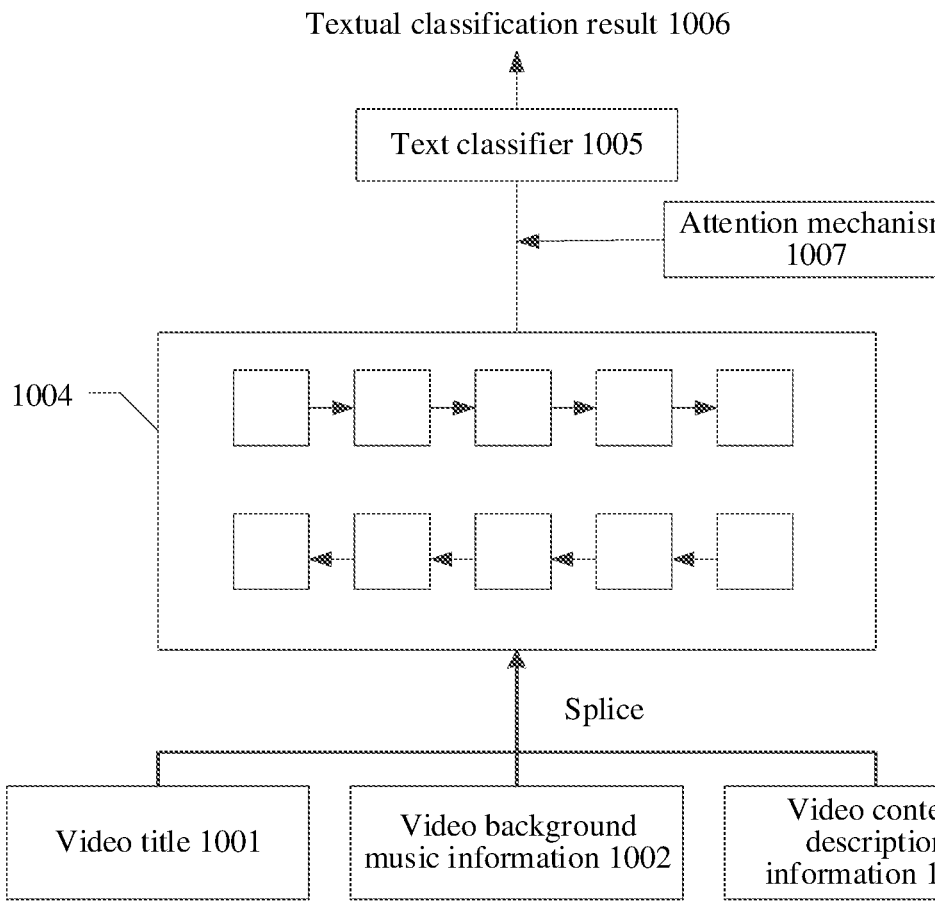
FIG. 10 is a schematic diagram of implementation of a video classification process through a Bi-LSTM and an attention mechanism according to an embodiment.

Schematically, as shown in FIG. 10, the server inputs a video title 1001, video background music information 1002, and video content description information 1003 that are preprocessed into a Bi-LSTM 1004. After a text feature is extracted by using the Bi-LSTM 1004, a textual classification result 1006 is outputted by using a text classifier 1005.

To further improve the accuracy of the textual classification result, this step may include the following steps.

1. Input the preprocessed textual description information to the Bi-LSTM.
2. Perform weight correction on an output result of the Bi-LSTM by using an attention mechanism.

After an output result of the Bi-LSTM is obtained, instead of directly classifying the output result by using the text classifier, the server corrects a weight in the output result by using an attention mechanism, and after completing weight correction, inputs a corrected output result to the text classifier.

A weight correction manner includes: improving a weight of an attentional result and reducing a weight of a non-attentional result.

Schematically, as shown in FIG. 10, before the output result of the Bi-LSTM 1004 is inputted to the text classifier 1005, the attention mechanism 1007 performs weight correction on the output result.

3. Classify the corrected output result of the Bi-LSTM by using the text classifier, to obtain the textual classification result.

The attention mechanism is introduced to modify the output result of the Bi-LSTM, further improving the accuracy of the output result, thereby improving the accuracy of a finally obtained textual classification result.

In the field of short videos, a user may capture and upload a short video by using a short video application, and the server classifies the short video, and then performs video recommendation for the user according to a class of the short video. However, in an actual classification process, it is found that, there are some videos which have similar pictures but differ greatly in audio (such as dubbing short videos that users do not need to capture) in short videos uploaded by users. When performing classification on the short videos only based on an image feature, the server cannot distinguish the short videos which have similar pictures but differ greatly in audio, resulting in a poor effect of video classification.

However, when the video classification method provided in the foregoing embodiments is applied to short video classification, after the user captures and uploads a short video by using the short video application, the server extracts an image frame in the short video and classifies the short video based on an image feature of the image frame. Simultaneously, the server extracts an audio of the short video, and classifies the short video based on an audio feature of the audio. In addition, the server obtains textual description information (such as the title of the short video, the name of background music, and a content description of the short video) added when the user uploads the short video, and classifies the short video based on a text feature of the textual description information.

Further, the server fuses video classification results obtained in an image dimension, an audio dimension, and a text dimension, to finally determine a target class of the short video. When recommending a short video to the user subsequently, the server recommends, according to a user profile of the current user, a short video whose video class matches the user profile to the user, thereby improving a matching degree between the recommended video and user preferences.

The following describes apparatus embodiments of this application, which can be used for executing the method embodiments of this application. For details not disclosed in the apparatus embodiments of this application, refer to the method embodiments of this application.

Figure 11:
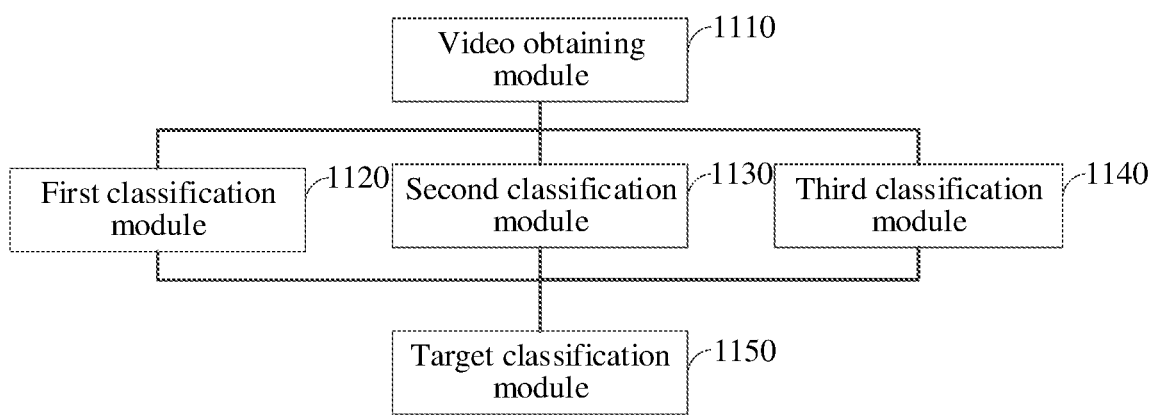
FIG. 11 is a block diagram of a video classification apparatus according to an embodiment of this application.

FIG. 11 is a block diagram of a video classification apparatus according to an embodiment of this application. The apparatus may be the server 140 in the implementation environment shown in FIG. 1, or may be disposed on the server 140. The apparatus may include:

- a video obtaining module 1110, configured to obtain a target video;
- a first classification module 1120, configured to classify an image frame in the target video by using a first classification model, to obtain an image classification result, the first classification model being configured to perform classification based on an image feature of the image frame;
- a second classification module 1130, configured to classify an audio in the target video by using a second classification model, to obtain an audio classification result, the second classification model being configured to perform classification based on an audio feature of the audio;
- a third classification module 1140, configured to classify textual description information corresponding to the target video by using a third classification model, to obtain a textual classification result, the third classification model being configured to perform classification based on a text feature of the textual description information; and a target classification module 1150, configured to determine a target classification result of the target video according to the image classification result, the audio classification result, and the textual classification result.

In one embodiment, the first classification module 1120 includes:

- a determining unit, configured to determine an original image frame extracted from the target video as a red, green, and blue (RGB) image frame;
- a first image classification unit, configured to classify the RGB image frame by using a residual network and an RGB classifier in the first classification model, to obtain a first image classification result, the RGB classifier being configured to perform classification based on a static image feature;
- a generation unit, configured to generate an RGB difference image frame according to two adjacent original image frames in the target video; and
- a second image classification unit, configured to classify the RGB difference image frame by using a residual network and an RGB difference classifier in the first classification model, to obtain a second image classification result, the RGB difference classifier being configured to perform classification based on a dynamic image feature.

In another embodiment, the first classification module 1120 further includes:

- a third image classification unit, configured to classify the RGB image frame by using a target detection network and a fine granularity classifier in the first classification model, to obtain a third image classification result, the target detection network being configured to extract a fine granularity image feature of a target object in the RGB image frame, and the fine granularity classifier being configured to perform classification based on the fine granularity image feature.

In one embodiment, the second classification module 1130 includes:

- a first extraction unit, configured to extract a Mel-frequency cepstral coefficient (MFCC) of the audio;
- a second extraction unit, configured to perform feature extraction on the MFCC by using a VGGish network in a second classification model, to obtain a VGGish feature;
- a first audio classification unit, configured to classify the VGGish feature by using a general classifier in the second classification model, to obtain a first audio classification result; and
- a second audio classification unit, configured to classify the VGGish feature by using at least one specific classifier in the second classification model, to obtain at least one second audio classification result,
- a quantity of classes in the general classifier being the same as a quantity of preset classes for videos, the specific classifier being configured to perform classification based on a specific class, the specific class being one of the preset classes for videos, and different specific classifiers being corresponding to different specific classes.

In one embodiment, the third classification module 1140 includes:

- an information obtaining unit, configured to obtain the textual description information corresponding to the target video, the textual description information including at least one of a video title, video content description information, and video background music information;
- a preprocessing unit, configured to preprocess the textual description information, a preprocessing manner including at least one of de-noising, word segmentation, entity word retrieving, and stop word removal; and
- a text classification unit, configured to classify the preprocessed textual description information by using a Bi-directional long short-term memory network (Bi-LSTM) and a text classifier in the third classification model, to obtain the textual classification result.

In one embodiment, the text classification unit is configured to:

- input the preprocessed textual description information to the Bi-LSTM;
- perform weight correction on an output result of the Bi-LSTM by using an attention mechanism; and
- classify the corrected output result of the Bi-LSTM by using the text classifier, to obtain the textual classification result.

In one embodiment, the target classification module 1150 includes:

- a splicing unit, configured to splice probabilities corresponding to classes in the image classification result, the audio classification result, and the textual classification result, to generate a classification feature vector; and
- a target classification unit, configured to input the classification feature vector to a target classifier, to obtain the target classification result, the target classifier being constructed based on a softmax classification model.

In conclusion, in this embodiment of this application, after the to-be-classified target video is obtained, the image frame is classified by using the first classification model to obtain the image classification result, the audio is classified by using the second classification model to obtain the audio classification result, and the textual description information is classified by using the third classification model to obtain the textual classification result, thereby determining the target classification result of the target video according to the image classification result, the audio classification result, and the textual classification result. Compared with the related art in which video classification is performed only based on an image feature of a video, in this embodiment of this application, classification is performed based on the image feature, the audio feature, and the text feature of the video comprehensively, and the features in different dimensions of the video are fully considered, thereby improving the accuracy of video classification.

Figure 12:
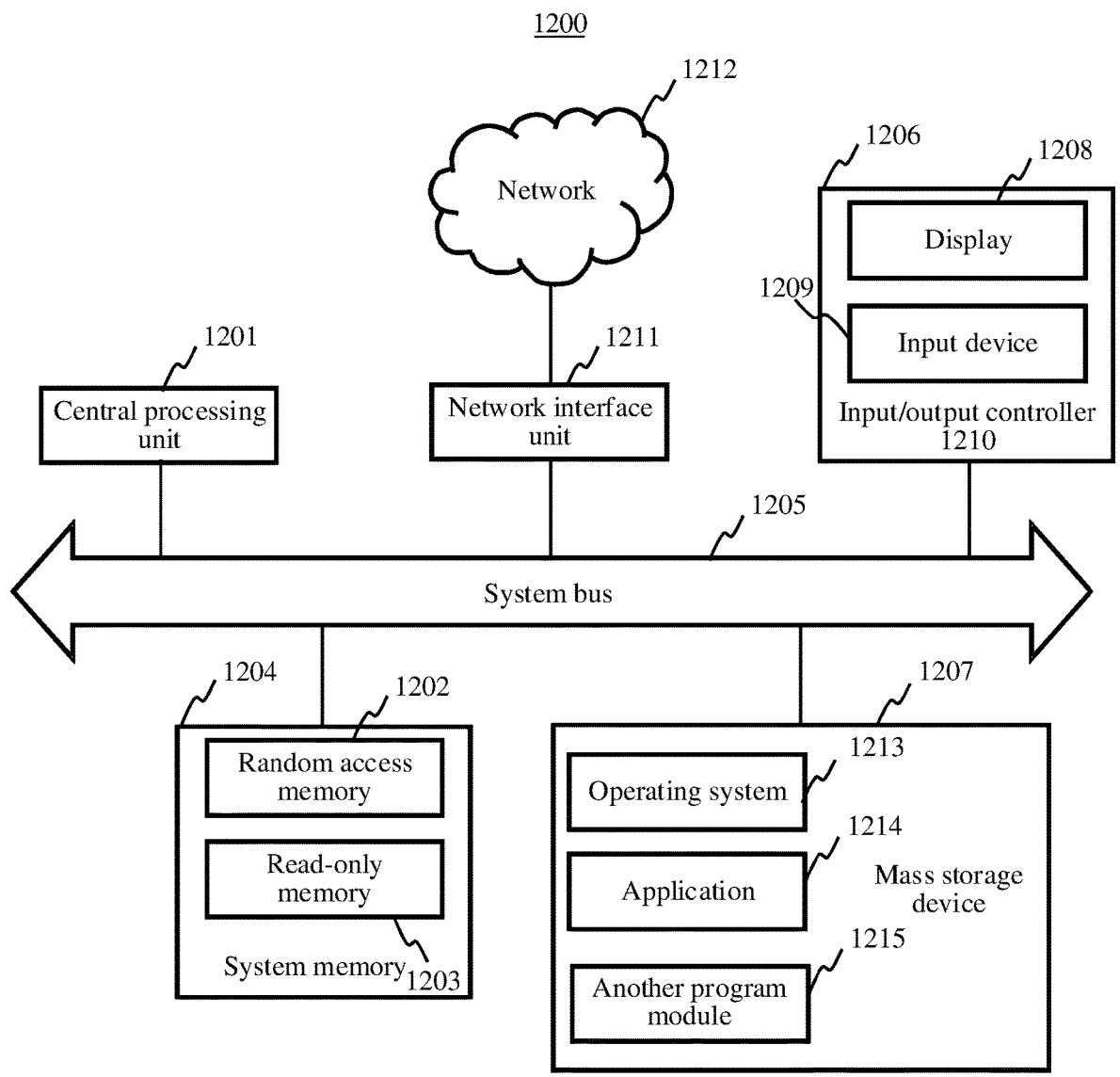
FIG. 12 is a block diagram of a computer device specifically being a server according to an embodiment of this application.

FIG. 12 is a schematic structural diagram of a computer device according to an embodiment of this application. The server is configured to implement the video classification method provided in the foregoing embodiments. Specifically:

The computer device 1200 includes a central processing unit (CPU) 1201, a system memory 1204 including a random access memory (RAM) 1202 and a read-only memory (ROM) 1203, and a system bus 1205 connecting the system memory 1204 and the CPU 1201. The computer device 1200 further includes a basic input/output (I/O) system 1206 configured to transmit information between components in a computer, and a mass storage device 1207 configured to store an operating system 1213, an application 1214, and another program module 1215.

The basic I/O system 1206 includes a display 1208 configured to display information and an input device 1209 such as a mouse or a keyboard that is used for inputting information by a user. The display 1208 and the input device 1209 are both connected to the CPU 1201 by using an input/output controller 1210 connected to the system bus 1205. The basic I/O system 1206 may further include the input/output controller 1210, to receive and process inputs from a plurality of other devices, such as the keyboard, the mouse, or an electronic stylus. Similarly, the input/output controller 1210 further provides an output to a display, a printer or another type of output device.

The mass storage device 1207 is connected to the CPU 1201 by using a mass storage controller (not shown) connected to the system bus 1205. The mass storage device 1207 and an associated computer-readable medium provide non-volatile storage for the computer device 1200. That is, the mass storage device 1207 may include a computer readable medium (not shown), such as a hard disk or a CD-ROM drive.

The term module (and other similar terms such as unit, submodule, etc.) in this disclosure may refer to a software module, a hardware module, or a combination thereof. A software module (e.g., a computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions or processes, such as the goals/objectives described in this disclosure, and may work together with other related modules, programs, and components to achieve those functions, processes, and/or goals/objectives.

Without loss of generality, the computer readable medium may include a computer storage medium and a communication medium. The computer storage medium includes volatile and non-volatile, removable and non-removable media that store information such as computer-readable instructions, data structures, program modules, or other data and that are implemented by using any method or technology. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. Certainly, a person skilled in the art may know that the computer storage medium is not limited to the foregoing. The system memory 1204 and the mass storage device 1207 may be collectively referred to as a memory.

According to the embodiments of this application, the computer device 1200 may be further connected, through a network such as the Internet, to a remote computer on the network, and run. That is, the computer device 1200 may be connected to a network 1212 by using a network interface unit 1211 connected to the system bus 1205, or may be connected to another type of network or a remote computer system by using a network interface unit 1211.

An embodiment of this application further provides a computer-readable storage medium. The storage medium stores computer-readable instructions, the computer-readable instructions being executed by a processor to perform the video classification method provided in the foregoing embodiments.

This application further provides a computer program product including instructions, the instructions causing, when run on a computer, the computer to perform the video classification method according to the foregoing embodiments.

The sequence numbers of the foregoing embodiments of this application are merely for description purpose but do not indicate the preference of the embodiments.

A person of ordinary skill in the art may understand that all or some of the steps in a video classification method of the foregoing embodiments may be implemented by hardware, or may be implemented by a program instructing related hardware. The program may be stored in a computer-readable storage medium. The storage medium mentioned above may be a ROM, a magnetic disk, or an optical disc. The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A video classification method, performed by a computer device, the method comprising:
 obtaining a target video;
 classifying an image frame in the target video by using a first classification model, to obtain an image classification result, the first classification model being configured to perform classification based on an image feature of the image frame;
 classifying an audio in the target video by using a second classification model, to obtain an audio classification result, the second classification model being configured to perform classification based on an audio feature of the audio;
 classifying textual description information corresponding to the target video by:
  using a third classification model, to obtain a textual classification result, the third classification model being configured to perform classification based on a text feature of the textual description information;
  obtaining the textual description information corresponding to the target video, the textual description information comprising at least one of a video title, video background music information, or video publisher information;
  preprocessing the textual description information, wherein the preprocessing comprises at least one of de-noising, word segmentation, entity word retrieving, or stop word removal; and classifying the preprocessed textual description information by using a Bi-directional long short-term memory network (Bi-LSTM) and a text classifier in the third classification model, to obtain the textual classification result; and determining a target classification result of the target video according to the image classification result, the audio classification result, and the textual classification result.

2. The method according to claim 1, wherein the image classification result comprises a first image classification result, further wherein the classifying an image frame in the target video by using a first classification model, to obtain an image classification result further comprises:

determining an original image frame extracted from the target video as an RGB image frame; and classifying the RGB image frame by using a residual network and an RGB classifier in the first classification model, to obtain the first image classification result, wherein the RGB classifier is configured to perform classification based on a static image feature of the RGB image frame.

3. The method according to claim 2, wherein the image classification result comprises a second image classification result, further wherein the classifying an image frame in the target video by using a first classification model, to obtain an image classification result further comprises:

generating an RGB difference image frame according to two adjacent original image frames in the target video; and classifying the RGB difference image frame by using a residual network and an RGB difference classifier in the first classification model, to obtain the second image classification result, wherein the RGB difference classifier is configured to perform classification based on a dynamic image feature of the RGB difference image frame.

4. The method according to claim 3, wherein the image classification result comprises a third image classification result, further wherein the classifying an image frame in the target video by using a first classification model, to obtain an image classification result further comprises:

determining an original image frame extracted from the target video as an RGB image frame; and classifying the RGB image frame by using a target detection network and a fine granularity classifier in the first classification model, to obtain a third image classification result, wherein the target detection network is configured to extract a fine granularity image feature of a target object in the RGB image frame, and the fine granularity classifier is configured to perform classification based on the fine granularity image feature.

5. The method according to claim 1, wherein the audio classification result comprises a first audio classification result, further wherein the classifying an audio in the target video by using a second classification model, to obtain an audio classification result further comprises:

extracting a Mel-frequency cepstral coefficient (MFCC) of the audio;

performing feature extraction on the MFCC by using a VGGish network in a second classification model, to obtain a VGGish feature; and classifying the VGGish feature by using a general classifier in the second classification model, to obtain the first audio classification result.

6. The method according to claim 5, wherein the audio classification result further comprises a second audio classification result, wherein the method further comprises:

classifying the VGGish feature by using at least one specific classifier in the second classification model, to obtain the second audio classification result outputted by each specific classifier, wherein a quantity of classes in the general classifier are a same quantity of preset classes for videos, wherein the specific classifier is configured to perform classification based on a specific class, which is one of the preset classes for videos, and different specific classifiers correspond to different specific classes.

7. The method according to claim 1, wherein the classifying the preprocessed textual description information by using the Bi-LSTM and the text classifier in the third classification model, to obtain the textual classification result further comprises:

inputting the preprocessed textual description information to the Bi-LSTM; performing weight correction on an output result of the Bi-LSTM by using an attention mechanism; and classifying the corrected output result of the Bi-LSTM by using the text classifier, to obtain the textual classification result.

8. The method according to claim 1, wherein the determining a target classification result of the target video according to the image classification result, the audio classification result, and the textual classification result further comprises:

splicing probabilities corresponding to classes in the image classification result, the audio classification result, and the textual classification result, to generate a classification feature vector; and inputting the classification feature vector to a target classifier, to obtain the target classification result, the target classifier being constructed based on a softmax classification model.

9. A computing apparatus comprising a processor and a memory, the memory storing computer-readable instructions, the computer-readable instructions, when executed by the processor, causing the processor to perform operations comprising:

obtaining a target video;

classifying an image frame in the target video by using a first classification model, to obtain an image classification result, the first classification model being configured to perform a classification based on an image feature of the image frame;

classifying an audio in the target video by using a second classification model, to obtain an audio classification result, the second classification model being configured to perform a classification based on an audio feature of the audio;

classifying textual description information corresponding to the target video by:

using a third classification model, to obtain a textual classification result, the third classification model being configured to perform a classification based on a text feature of the textual description information;

obtaining the textual description information corresponding to the target video, the textual description information comprising at least one of a video title, video background music information, or video publisher information;

preprocessing the textual description information, wherein the preprocessing comprises at least one of de-noising, word segmentation, entity word retrieving, or stop word removal; and classifying the preprocessed textual description information by using a Bi-directional long short-term memory network (Bi-LSTM) and a text classifier in the third classification model, to obtain the textual classification result; and determining a target classification result of the target video based on the image classification result, the audio classification result, and the textual classification result.

10. The apparatus according to claim 9, wherein the image classification result comprises a first image classification result, and the classifying by using the first classification model further comprises:

determining an original image frame extracted from the target video as an RGB image frame; and classifying the RGB image frame by using a residual network and an RGB classifier in the first classification model, to obtain the first image classification result, the RGB classifier being configured to perform classification based on a static image feature of the RGB image frame.

11. The apparatus according to claim 10, wherein the image classification result comprises a second image classification result, and the classifying by using the first classification model further comprises:

generating an RGB difference image frame according to two adjacent original image frames in the target video; and classifying the RGB difference image frame by using a residual network and an RGB difference classifier in the first classification model, to obtain the second image classification result, the RGB difference classifier being configured to perform classification based on a dynamic image feature of the RGB difference image frame.

12. The apparatus according to claim 11, wherein the image classification result comprises a third image classification result, and the classifying by using the first classification model further comprises:

determining an original image frame extracted from the target video as an RGB image frame; and classifying the RGB image frame by using a target detection network and a fine granularity classifier in the first classification model, to obtain a third image classification result, the target detection network being configured to extract a fine granularity image feature of a target object in the RGB image frame, and the fine granularity classifier being configured to perform classification based on the fine granularity image feature.

13. The apparatus according to claim 9, wherein the audio classification result comprises a first audio classification result, wherein the classifying by using the second classification model further comprises:

extracting a Mel-frequency cepstral coefficient (MFCC) of the audio;

performing feature extraction on the MFCC by using a VGGish network in a second classification model, to obtain a VGGish feature; and classifying the VGGish feature by using a general classifier in the second classification model, to obtain the first audio classification result.

14. The apparatus according to claim 13, wherein the audio classification result further comprises a second audio classification result, wherein the classifying by using the second classification model further comprises:

classifying the VGGish feature by using at least one specific classifier in the second classification model, to obtain the second audio classification result outputted by each specific classifier, wherein a quantity of classes in the general classifier are a same quantity of preset classes for videos, wherein the specific classifier is configured to perform classification based on a specific class, which is one of the preset classes for videos, and different specific classifiers correspond to different specific classes.

15. The apparatus according to claim 9, wherein the classifying the preprocessed textual description information further comprises:

inputting the preprocessed textual description information to the Bi-LSTM; performing weight correction on an output result of the Bi-LSTM by using an attention mechanism; and classifying the weight corrected output result of the Bi-LSTM by using the text classifying, to obtain the textual classification result.

16. The apparatus according to claim 9, wherein determining the target classification result of the target video further comprises:

splicing probabilities corresponding to classes in the image classification result, the audio classification result, and the textual classification result, to generate a classification feature vector; and inputting the classification feature vector to a target classifier, to obtain the target classification result, the target classifier being constructed based on a softmax classification model.

17. A non-transitory computer-readable storage medium, storing computer-readable instructions, the computer-readable instructions, when executed by one or more processors, causing the one or more processors to perform operations comprising:

obtaining a target video;

classifying an image frame in the target video by using a first classification model, to obtain an image classification result, the first classification model being configured to perform classification based on an image feature of the image frame;

classifying an audio in the target video by using a second classification model, to obtain an audio classification result, the second classification model being configured to perform classification based on an audio feature of the audio;

classifying textual description information corresponding to the target video by:

using a third classification model, to obtain a textual classification result, the third classification model being configured to perform classification based on a text feature of the textual description information;

obtaining the textual description information corresponding to the target video, the textual description information comprising at least one of a video title, video background music information, or video publisher information;

preprocessing the textual description information, wherein the preprocessing comprises at least one of de-noising, word segmentation, entity word retrieving, or stop word removal; and classifying the preprocessed textual description information by using a Bi-directional long short-term memory network (Bi-LSTM) and a text classifier in the third classification model, to obtain the textual classification result; and determining a target classification result of the target video according to the image classification result, the audio classification result, and the textual classification result.

18. The non-transitory computer-readable storage medium of claim 17, wherein the obtaining the image classification result further comprises:
   determining an original image frame extracted from the target video as an RGB image frame; and
   classifying the RGB image frame by using a residual network and an RGB classifier in the first classification model, to obtain the first image classification result, wherein the RGB classifier being is configured to perform classification based on a static image feature of the RGB image frame;
   further wherein the obtaining the image classification result also comprises:
      generating an RGB difference image frame according to two adjacent original image frames in the target video; and
      classifying the RGB difference image frame by using a residual network and an RGB difference classifier in the first classification model, to obtain the second image classification result, wherein the RGB difference classifier being is configured to perform classification based on a dynamic image feature of the RGB difference image frame.

19. The non-transitory computer-readable storage medium of claim 17, wherein the classifying the preprocessed textual description information further comprises:
   inputting the preprocessed textual description information to the Bi-LSTM; performing weight correction on an output result of the Bi-LSTM by using an attention mechanism; and
   classifying the weight corrected output result of the Bi-LSTM by using the text classifying, to obtain the textual classification result.

20. The non-transitory computer-readable storage medium of claim 17, wherein determining the target classification result of the target video further comprises:
   splicing probabilities corresponding to classes in the image classification result, the audio classification result, and the textual classification result, to generate a classification feature vector; and
   inputting the classification feature vector to a target classifier, to obtain the target classification result, the target classifier being constructed based on a softmax classification model.

* * * * *